US012763039B2

(12) United States Patent
Liu

(10) Patent No.: US 12,763,039 B2
(45) Date of Patent: Oct. 13, 2026

(54) DRIVING METHOD OF DISPLAY PANEL AND DISPLAY PANEL

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 555 days.

(21) Appl. No.: 17/599,565

(22) PCT Filed: Jun. 23, 2021

(86) PCT No.: PCT/CN2021/101790

§ 371 (c)(1),
(2) Date: Sep. 29, 2021

(87) PCT Pub. No.: WO2022/156147

PCT Pub. Date: Jul. 28, 2022

(65) Prior Publication Data

US 2024/0046843 A1 Feb. 8, 2024

(30) Foreign Application Priority Data

Jan. 19, 2021 (CN) ........................ 202110069340.X

(51) Int. Cl.
*G09G 3/20* (2006.01)
*G09G 3/36* (2006.01)

(52) U.S. Cl.
CPC ......... *G09G 3/3677* (2013.01); *G09G 3/2074* (2013.01); *G09G 3/2096* (2013.01);
(Continued)

(58) Field of Classification Search
CPC .. G09G 3/3677; G09G 3/2074; G09G 3/2096; G09G 2310/0202;
(Continued)

(56) References Cited

U.S. PATENT DOCUMENTS 8,427,465 B2 * 4/2013 Kitayama ............ G09G 3/3614 345/100
9,530,350 B2 * 12/2016 Cho ..................... G09G 3/3233
(Continued)

FOREIGN PATENT DOCUMENTS

CN 104361878 A 2/2015
CN 106205461 A 12/2016
(Continued)

*Primary Examiner* — Michael J Jansen, II
(74) *Attorney, Agent, or Firm* — PV IP PC; Peter Stecher; Wei Te Chung

(57) ABSTRACT

A driving method of a display panel obtains a charging time required for each row of sub-pixels in the display panel to reach a target voltage. Then, according to the charging time required for each row of the sub-pixels to reach the target voltage, a duty ratio of a scan drive signal corresponding to each row of the sub-pixels is adjusted. So that, the sub-pixels in each position of the display panel can reach a same target voltage, thereby improving a problem of an uneven brightness of the display panel. And a display panel is also provided.

18 Claims, 7 Drawing Sheets

(52) U.S. Cl.
CPC ............... *G09G 2310/0202* (2013.01); *G09G 2310/0251* (2013.01); *G09G 2310/0267* (2013.01); *G09G 2310/08* (2013.01); *G09G 2320/0233* (2013.01)

(58) Field of Classification Search
CPC ... G09G 2310/0251; G09G 2310/0267; G09G 2310/08; G09G 2320/0233
See application file for complete search history.

(56) References Cited

U.S. PATENT DOCUMENTS

| | | | | |
|---|---|---|---|---|
| 9,626,925 | B2 * | 4/2017 | Cheng | G09G 3/3648 |
| 9,633,595 | B2 * | 4/2017 | Hwang | G09G 3/2092 |
| 9,779,675 | B2 * | 10/2017 | Park | G09G 3/3614 |
| 9,865,217 | B2 * | 1/2018 | Won | G09G 3/3681 |
| 10,324,319 | B2 * | 6/2019 | Lee | G09G 3/3688 |
| 10,339,868 | B2 * | 7/2019 | Morita | G06F 3/04812 |
| 10,403,224 | B2 * | 9/2019 | Hsu | G09G 3/3674 |
| 10,410,599 | B2 * | 9/2019 | Shin | G06F 3/1446 |
| 10,460,686 | B2 * | 10/2019 | Kwak | G09G 3/3677 |
| 10,580,339 | B2 * | 3/2020 | Lim | G09G 3/006 |
| 10,650,721 | B2 * | 5/2020 | Pyun | G09G 3/3611 |
| 10,783,824 | B2 * | 9/2020 | Hsu | G09G 3/20 |
| 10,818,236 | B2 * | 10/2020 | Gai | G09G 3/3233 |
| 10,867,570 | B2 * | 12/2020 | Lee | G09G 3/3688 |
| 10,896,636 | B2 * | 1/2021 | Pyun | G09G 3/3611 |
| 10,984,695 | B2 * | 4/2021 | Xiong | G09G 3/20 |
| 11,087,667 | B2 * | 8/2021 | Guo | G09G 3/3611 |
| 11,087,705 | B2 * | 8/2021 | Zhou | G09G 3/3677 |
| 11,222,578 | B2 * | 1/2022 | Kim | G09G 3/20 |
| 11,238,795 | B2 * | 2/2022 | He | G09G 3/3233 |
| 11,322,111 | B2 * | 5/2022 | Wei | G09G 3/3666 |
| 11,341,885 | B2 * | 5/2022 | Yang | G09G 3/20 |
| 11,830,406 | B2 * | 11/2023 | Koh | G09G 3/2007 |
| 2010/0238151 | A1 * | 9/2010 | Kitayama | G09G 3/3614 345/209 |
| 2014/0168281 | A1 * | 6/2014 | Ahn | G09G 3/3648 345/99 |
| 2015/0302816 | A1 * | 10/2015 | Won | G09G 3/3681 345/87 |
| 2016/0005357 | A1 * | 1/2016 | Cho | G09G 3/3677 345/78 |
| 2016/0027387 | A1 * | 1/2016 | Park | G09G 3/3611 345/88 |
| 2016/0203753 | A1 * | 7/2016 | Hwang | G09G 3/2092 345/212 |
| 2016/0284297 | A1 * | 9/2016 | Cheng | G09G 3/3648 |
| 2016/0343341 | A1 * | 11/2016 | Kwak | G09G 3/3677 |
| 2016/0365066 | A1 * | 12/2016 | Lim | G09G 3/2096 |
| 2017/0047001 | A1 * | 2/2017 | Shin | G09G 3/3275 |
| 2018/0046007 | A1 * | 2/2018 | Lee | G02F 1/13306 |
| 2018/0047339 | A1 * | 2/2018 | Morita | G09G 3/3283 |
| 2018/0047361 | A1 * | 2/2018 | Hsu | G09G 3/3607 |
| 2018/0315369 | A1 * | 11/2018 | Pyun | G09G 3/3677 |
| 2019/0189056 | A1 * | 6/2019 | Gai | G09G 3/3233 |
| 2019/0221149 | A1 | 7/2019 | Li et al. | |
| 2019/0340989 | A1 * | 11/2019 | Lee | G09G 3/006 |
| 2020/0098311 | A1 * | 3/2020 | Hsu | G06F 1/06 |
| 2020/0234622 | A1 * | 7/2020 | Xiong | G09G 3/20 |
| 2020/0234630 | A1 * | 7/2020 | Pyun | G09G 3/3677 |
| 2020/0388235 | A1 * | 12/2020 | Zhou | G09G 3/3677 |
| 2021/0150961 | A1 * | 5/2021 | Yang | G09G 3/20 |
| 2021/0166608 | A1 * | 6/2021 | Guo | G09G 3/2074 |
| 2021/0201838 | A1 * | 7/2021 | Wei | G09G 3/3666 |
| 2021/0335245 | A1 * | 10/2021 | He | G09G 3/3275 |
| 2021/0375188 | A1 * | 12/2021 | Kim | G09G 3/20 |
| 2023/0137600 | A1 * | 5/2023 | Koh | G09G 3/3266 345/691 |

FOREIGN PATENT DOCUMENTS

| | | | |
|---|---|---|---|
| CN | 106205540 | A | 12/2016 |
| CN | 109243400 | A | 1/2019 |
| CN | 109493779 | A | 3/2019 |
| CN | 109817175 | A | 5/2019 |
| CN | 110400547 | A | 11/2019 |
| CN | 111028777 | A | 4/2020 |
| CN | 112700745 | A | 4/2021 |

* cited by examiner

DRIVING METHOD OF DISPLAY PANEL AND DISPLAY PANEL

TECHNICAL FIELD

The present disclosure relates to a field of display technology, and more particularly to a driving method of a display panel and the display panel.

BACKGROUND

A display panel generally includes a display portion for displaying images, and a gate driving module and a source driving module for driving the display portion. The display portion includes a plurality of scan lines, a plurality of data lines, and a plurality of sub-pixels, and the plurality of sub-pixels are defined by intersections of the plurality of scan lines and the plurality of data lines. The gate driving module scans and drives each row of the sub-pixels in the display portion by the scan lines, and the source driving module applies gray-scale voltages to each column of the sub-pixels through the data lines, so that the display panel presents an image.

With a gradual increase in size of the display panel, a resistor-capacitor load of the data lines will also increase, resulting in a delay in transmission of gray-scale voltage signals, which is specifically manifested in that the sub-pixels close to a side of the source driving module can be fully charged to a target voltage within a specified charging time, and the sub-pixels on a side far from the source driving module cannot be fully charged to the target voltage within same charging time, so that actual voltages of the sub-pixels on the side close to the source driving module and of the sub-pixels on the side far away from the source driving module are different. This causes a brightness of different areas in the display portion to be different, leading to a problem of an uneven brightness of the display panel.

In summary, a conventional display panel has the problem of the uneven brightness. Therefore, it is necessary to provide a driving method of a display panel and a display panel to improve such defect.

SUMMARY

Embodiments of the present disclosure provide a driving method of a display panel and the display panel, which can solve a problem of an uneven brightness of conventional display panels.

The embodiments of the present disclosure provide a driving method of a display panel, and the driving method of the display panel includes:

- obtaining a charging time required for each row of sub-pixels in the display panel to reach a target voltage;
- adjusting a duty ratio of a scan drive signal corresponding to each row of sub-pixels according to the charging time required for each row of the sub-pixels to reach the target voltage; and
- scanning the display panel row by row according to the scan drive signal corresponding to each row of the sub-pixels.

According to an embodiment of the present disclosure, at least two detection points are provided with the display panel, and a detection point selected from the at least two detection points is configured to detect the charging time required for a row of sub-pixels corresponding to the detection point to reach the target voltage; the step of obtaining the charging time required for each row of the sub-pixels in the display panel to reach the target voltage includes:

- obtaining the charging time required for the row of sub-pixels corresponding to each of the detection points to reach the target voltage; and
- determining a charging time required for each row of the sub-pixels between two adjacent detection points to reach the target voltage charging time according to a charging time required for a row of sub-pixels corresponding to two adjacent detection points in the at least two detection points to reach the target voltage.

According to an embodiment of the present disclosure, the display panel is provided with a first detection point and a second detection point, the first detection point is configured to detect a charging time required for a first row of the sub-pixels in the display panel to reach the target voltage, and the second detection point is configured to detect a charging time required for a last row of the sub-pixels in the display panel to reach the target voltage.

According to an embodiment of the present disclosure, the display panel is further provided with a third detection point, and the third detection point is configured to detect a charging time required for a middle row of sub-pixels located between the first row of the sub-pixels and the last row of the sub-pixels to reach the target voltage.

According to an embodiment of the present disclosure, the display panel includes a plurality of scan line groups, and each of scan line groups includes at least two scan lines; the step of determining the charging time required for each row of the sub-pixels between two adjacent detection points to reach the target voltage charging time, according to the charging time required for the row of the sub-pixels corresponding to the two adjacent detection points in the at least two detection points to reach the target voltage includes:

- obtaining a charging time required for a sub-pixel corresponding to each scan line group between the two adjacent detection points to reach the target voltage by means of linear equipartition according to the charging time required for the row of the sub-pixels corresponding to two adjacent detection points of the at least two detection points to reach the target voltage and a number of scan line groups between the two adjacent detection points; and
- wherein the row of the sub-pixels corresponding to each scan line in same scan line group requires a same charging time to reach the target voltage.

According to an embodiment of the present disclosure, the step of adjusting the duty ratio of the scan drive signal corresponding to each row of the sub-pixels according to the charging time required for each row of the sub-pixels to reach the target voltage includes:

- adjusting a duty ratio of a clock signal corresponding to each scan line group according to the charging time required for the sub-pixels corresponding to each scan line group to reach the target voltage; and
- adjusting a duty ratio of a scan drive signal corresponding to each scan line in each scan line group in turn according to the clock signal corresponding to each scan line group.

According to an embodiment of the present disclosure, a high level duration of the clock signal corresponding to each scan line group is same as a high level duration of a scan drive signal corresponding to a plurality of rows of sub-pixels connected to the scan line group.

According to an embodiment of the present disclosure, from a first scan line group to a last scan line group, the duty ratio of the clock signal gradually increases, and a duty ratio of the clock signal corresponding to each scan line in a same scan line group is same.

The embodiments of the present disclosure further provide a display panel, including a plurality of scan lines, a plurality of data lines, and a plurality of sub-pixels arranged in an array; wherein sub-pixels in a same row among the plurality of sub-pixels are connected to a same scan line, and sub-pixels in a same column are connected to a same data line; and the display panel further includes:

a detection module, configured to obtain a charging time required for each row of the sub-pixels in the display panel to reach a target voltage;

a timing control module, configured to adjust a duty ratio of a scan drive signal corresponding to each row of the sub-pixels according to the charging time required for each row of the sub-pixels to reach the target voltage; and a gate driving module, configured to scan the sub-pixels row by row according to the scan drive signal corresponding to each row of the sub-pixels.

According to an embodiment of the present disclosure, at least two detection points are provided with the display panel, and a detection point selected from the at least two detection points is configured to detect a charging time required for a row of sub-pixels corresponding to the detection point to reach the target voltage; wherein the detection module includes:

a calculation module, configured to calculate a charging time required for each row of sub-pixels between two adjacent detection points to reach the target voltage according to a charging time required for a row of sub-pixels corresponding to two adjacent detection points in the at least two detection points to reach the target voltage.

According to an embodiment of the present disclosure, the display panel is provided with a first detection point and a second detection point, the first detection point is configured to detect a charging time required for a first row of sub-pixels in the display panel to reach the target voltage, and the second detection point is configured to detect a charging time required for a last row of sub-pixels in the display panel to reach the target voltage.

According to an embodiment of the present disclosure, the display panel is further provided with a third detection point, and the third detection point is configured to detect a charging time required for a middle row of sub-pixels located between the first row of sub-pixels and the last row of sub-pixels to reach the target voltage.

According to an embodiment of the present disclosure, the display panel includes a plurality of scan line groups, and each of the scan line groups includes at least two scan lines, and a row of sub-pixels corresponding to each scan line in a same scan line group requires a same charging time to reach the target voltage.

According to an embodiment of the present disclosure, a high level duration of a clock signal corresponding to each scan line group is same as a high level duration of a scan drive signal corresponding to a plurality of rows of sub-pixels connected to the scan line group.

According to an embodiment of the present disclosure, the calculation module is further configured to obtain a charging time required for a sub-pixel corresponding to each scan line group between the two adjacent detection points to reach the target voltage by means of linear equipartition according to the charging time required for the row of the sub-pixels corresponding to the two adjacent detection points of the at least two detection points to reach the target voltage and a number of scan line groups between the two adjacent detection points.

According to an embodiment of the present disclosure, the timing control module includes an adjustment module, which is configured to adjust a duty ratio of a clock signal corresponding to each scan line group according to a charging time required for sub-pixels corresponding to each scan line group to reach the target voltage.

According to an embodiment of the present disclosure, from a first scan line group to a last scan line group, the duty ratio of the clock signal gradually increases, and a duty ratio of the clock signal corresponding to the scan line in a same scan line group are same.

The beneficial effects of the embodiments of the present disclosure: the embodiments of the present disclosure provide a driving method of a display panel and the display panel. The driving method of the display panel obtains a charging time required for each row of sub-pixels in the display panel to reach a target voltage. Then, according to the charging time required for each row of sub-pixels to reach the target voltage, a duty ratio of a scan drive signal corresponding to each row of sub-pixels is adjusted. Then, the display panel is scanned row by row according to the scan drive signal corresponding to each row of sub-pixels. By adjusting the charging time of the sub-pixels in different positions of the display panel, the sub-pixels in each position of the display panel can reach the same target voltage, thereby improving the problem of uneven brightness of the display panel.

DESCRIPTION OF DRAWINGS

In order to explain the embodiments of the present disclosure more clearly, the following briefly introduces the drawings that need to be used in the embodiments. The drawings in the following description are only part of the embodiments of the present disclosure. For those of ordinary skill in the art, other drawings can be obtained based on these drawings without creative work.

DETAILED DESCRIPTION OF PREFERRED EMBODIMENTS

Figure 1:
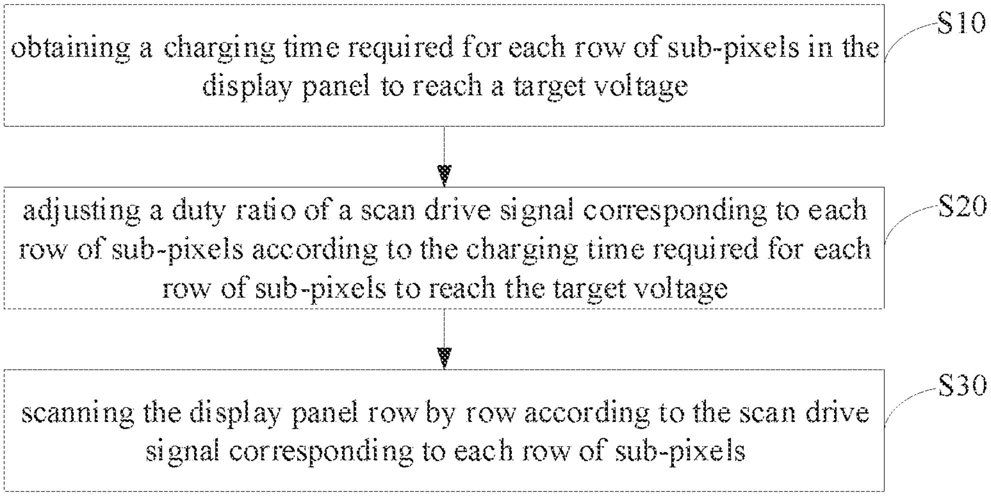
FIG. 1 is a schematic flowchart of a driving method of a display panel provided by an embodiment of the present disclosure.

The description of following embodiments refers to the attached drawings to illustrate specific embodiments that the present disclosure can be implemented. Directional terms mentioned in this disclosure, such as “top”, “bottom”, "front", "rear", "left", "right", "inside", "outside", "side", etc., are only directions for referring to the attached drawings. Therefore, the directional terms used are used to illustrate and understand the present disclosure, rather than to limit the present disclosure. In the figure, units with similar structures are indicated by same reference numerals.

The present disclosure will be further described below in conjunction with drawings and specific embodiments:

Embodiments of the present disclosure provide a driving method of a display panel. A detailed description will be given below in conjunction with FIG. 1.

Referring to FIG. 1, FIG. 1 is a schematic flowchart of the driving method of the display panel provided by an embodiment of the present disclosure. The driving method of the display panel includes:

Step S10: obtaining a charging time required for each row of sub-pixels in the display panel to reach a target voltage.

In one embodiment, at least two detection points are provided with the display panel, and a detection point selected from the at least two detection points is configured to detect the charging time required for a row of sub-pixels corresponding to the detection point to reach the target voltage. A step of obtaining the charging time required for each row of the sub-pixels in the display panel to reach the target voltage includes:

Step S101: obtaining the charging time required for the row of the sub-pixels corresponding to each of the detection points to reach the target voltage; and Step S102: determining the charging time required for each row of the sub-pixels between two adjacent detection points to reach the target voltage according to the charging time required for the row of the sub-pixels corresponding to two adjacent detection points in the at least two detection points to reach the target voltage.

It can be understood that to detect the charging time required for the row of the sub-pixels to reach the target voltage, it needs to be calculated from time when the row of the sub-pixels starts to scan until a voltage of the row of the sub-pixels reaches the target voltage. In this embodiment, the detection point may be an actual detection point or a virtual detection point. In addition, in this embodiment, an external detection device may be configured to detect the at least two detection points to obtain the charging time required for a row of the sub-pixels corresponding to the detection points to reach the target voltage. In some other embodiments, a detection module can also be arranged inside the display panel, and each detection point is connected to the detection module through a signal line. The detection module is configured to obtain the charging time required for a row of the sub-pixels corresponding to each detection point to reach the target voltage.

Figure 2:
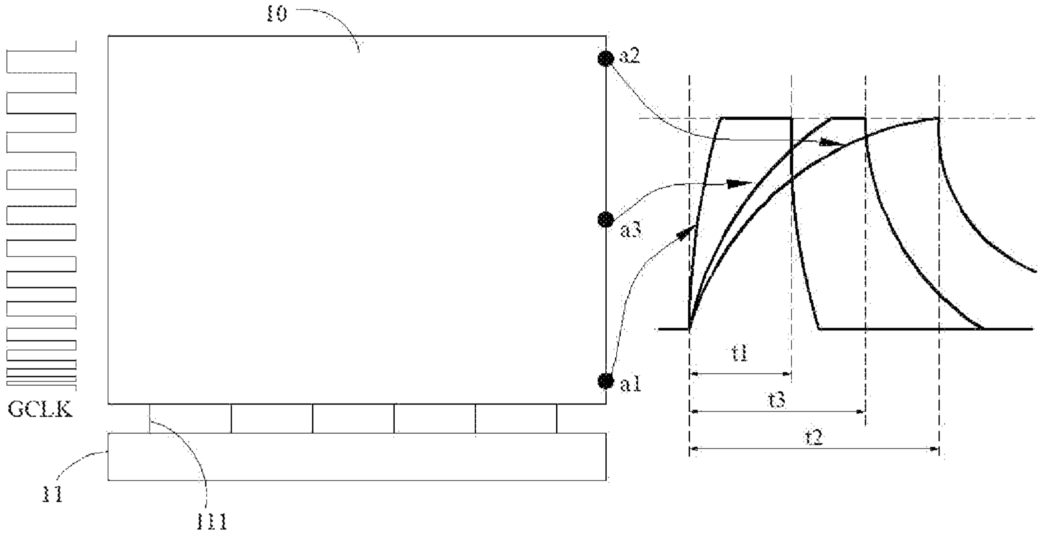
FIG. 2 is a schematic diagram of detection provided by an embodiment of the present disclosure.

In one embodiment, referring to FIG. 2, FIG. 2 is a schematic diagram of detection provided by an embodiment of the present disclosure. The display panel includes a display portion 10, a source driving module 11 disposed on one side of the display portion, and a gate driving module (not shown in figure) disposed on another side of the display portion. The display portion 10 is provided with a plurality of sub-pixels arranged in an array. The source driving module 11 is connected to the display portion 10 through a plurality of data lines 111, and each data line 111 is connected to a column of sub-pixels, and each row of the sub-pixels is connected to a gate line. The gate driving module is connected to the display portion through a plurality of scan lines, and each scan line is connected to a row of sub-pixels. In this embodiment, a first detection point a1 and a second detection point a2 are provided in the display panel. The first detection point a1 is arranged on a side of the display portion 10 close to the source driving module 11, and is configured to detect the charging time required for a first row of sub-pixels to reach the target voltage. The second detection point a2 is arranged on a side of the display portion 10 away from the source driving module 11 and is configured to detect the charging time required for a last row of sub-pixels to reach the target voltage.

In one embodiment, referring to FIG. 2, the display panel is provided with the first detection point a1, the second detection point a2, and a third detection point a3. The third detection point a3 is arranged between the first detection point a1 and the second detection point a2, and is configured to detect the charging time required for a middle row of sub-pixels located between the first row of the sub-pixels and the last row of the sub-pixels to reach the target voltage. Of course, in some embodiments, a number of detection points is not limited to two or three in the embodiments of the present disclosure, and can also be three or more. The number of detection points disposed on the display panel and locations of the detection points can be set according to actual situations, and there is no restriction here.

Figure 3:
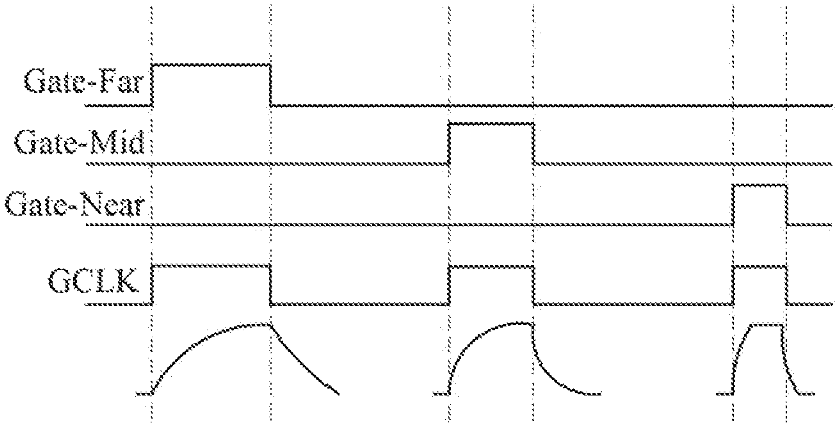
FIG. 3 is a timing diagram of each detection point provided by an embodiment of the present disclosure.

Taking the display panel shown in FIG. 2 as an example, the row of the sub-pixels corresponding to the first detection point a1, the second detection point a2, and the third detection point a3 are detected respectively. It can be seen from a waveform diagram on a left in FIG. 2 that a time t1 required for the first row of the sub-pixels closest to the source driving module 11 to reach the target voltage is the smallest, a time t3 required for the row of the sub-pixels in the middle to reach the target voltage is second lowest, and a charging time t2 required for the last row of the sub-pixels furthest from the source driving module 11 to reach the target voltage is the largest. Referring to FIG. 3, FIG. 3 is a timing diagram of each detection point provided by an embodiment of the present disclosure. During a detection process, a scan drive signal Gate-Far of the last row of the sub-pixels and a corresponding clock signal GCLK maintain a high level for a same time, and the time to maintain the high level is the longest. A scan drive signal Gate-Mid of the row of the sub-pixels located in the middle and a corresponding clock signal GCLK maintain a high level for a same time, and the time for maintaining the high level is second longest. A scan drive signal Gate-Near of the first row of the sub-pixels and a corresponding clock signal GCLK maintain the high level for a same time, and the time for maintaining the high level is the shortest. A waveform curve below an clock signal GCLK is a waveform of the scan drive signal during an actual test. Namely, in the display portion 10, from an end close to the source driving module 11 to an end far away from the source driving module 11, the time that the clock signal GCLK remains high level should be in an increasing state as shown on a left side of FIG. 1 so that the sub-pixels of each portion of the display panel can reach the target voltage within a specified charging time.

In one embodiment, the display panel includes a plurality of scan line groups, and each of scan line groups includes at least two scan lines. A step of determining the charging time required for each row of the sub-pixels between two adjacent detection points to reach the target voltage according to the charging time required for the row of the sub-pixels corresponding to the two adjacent detection points in the at least two detection points to reach the target voltage includes: obtaining a charging time required for a sub-pixel corresponding to each scan line group between the two adjacent detection points to reach the target voltage by means of linear equipartition according to the charging time required for the row of the sub-pixels corresponding to the two adjacent detection points of the at least two detection points to reach the target voltage and a number of scan line groups between the two adjacent detection points; and wherein a charging time required for each row of the sub-pixels corresponding to each scan line to reach the target voltage is same.

Figure 4:
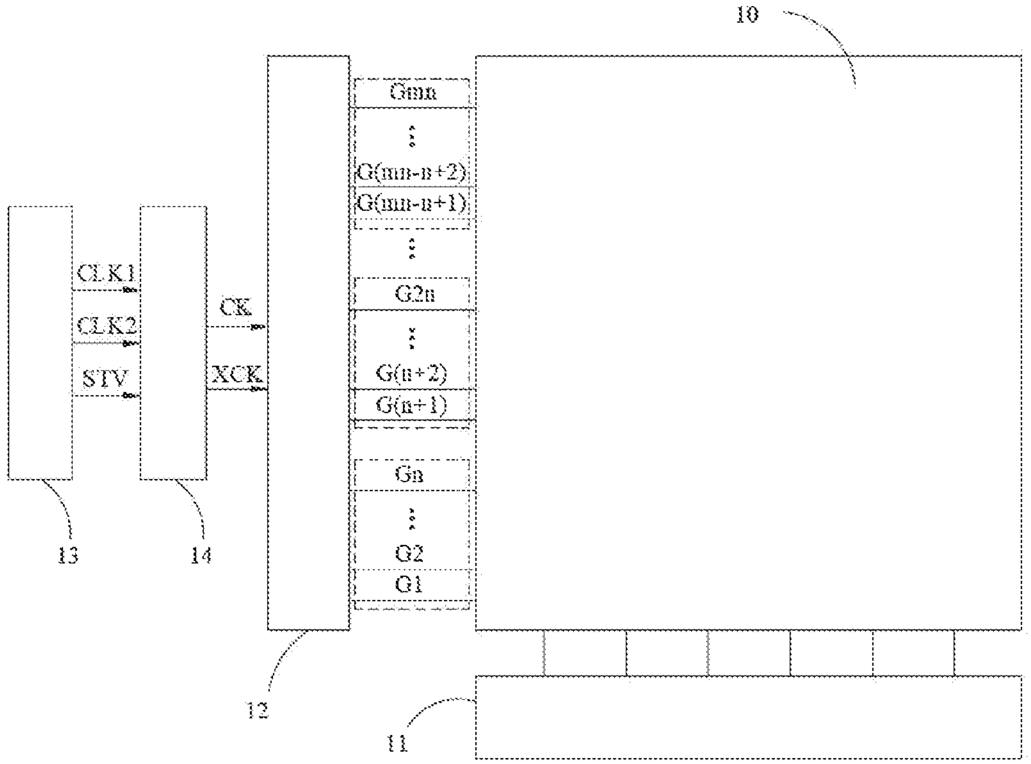
FIG. 4 is a schematic structural diagram of the display panel provided by an embodiment of the present disclosure.

Taking the display panel shown in FIG. 4 as an example, m×n scan lines are provided in the display panel, and the m×n scan lines are divided into m scan line groups. Each scan line group includes n scan lines, wherein m and n are both positive integers, and m and n≥2. Referring to FIG. 4, a first scan line group includes n scan lines arranged at intervals and in sequence, which are respectively configured to transmit corresponding scan drive signals (G1, G2 . . . Gn). A second scan line group includes n scan lines arranged at intervals and in sequence, which are respectively configured to transmit corresponding scan drive signals (G(n+1), G(n+2) . . . G2*n*). By analogy, a mth scan line group includes n scan lines, which are respectively configured to transmit corresponding scan drive signals (G(mn−n+1), G(mn−n+2) . . . Gmn).

Take m=10, n=6 as an example, namely, there are 10 scan line groups in the display panel, and each scan line group includes 6 scan lines. When it is detected that t1=1.3 s, t3=1.8 s, and t2=2.2 s in FIG. 2, according to a linear equipartition method, a difference in charging time between any two adjacent scan line groups is same. There are 6 scan line groups between the first detection point a1 and the third detection point a3, and there are 4 scan line groups between the second detection point a2 and the third detection point a3. Namely, the charging time T1-T10 corresponding to the first scan line group to a tenth scan line group are: 1.3 s, 1.4 s, 1.5 s, 1.6 s, 1.7 s, 1.8 s, 1.9 s, 2.0 s, 2.1 s, 2.2 s. A charging time required for a row of the sub-pixels corresponding to each scan line in the first scan line group to reach the target voltage is 1.3 s. A charging time required for a row of sub-pixels corresponding to each scan line in a second scan line group to reach the target voltage is 1.4 s. By analogy, a charging time required for a row of sub-pixels corresponding to each scan line in the 10th scan line group to reach the target voltage is 2.2 s.

Step S20: adjusting a duty ratio of a scan drive signal corresponding to each row of the sub-pixels according to the charging time required for each row of the sub-pixels to reach the target voltage.

In one embodiment, a step of adjusting the duty ratio of the scan drive signal corresponding to each row of the sub-pixels according to the charging time required for each row of the sub-pixels to reach the target voltage includes:

Step S201: adjusting the duty ratio of a clock signal corresponding to each scan line group according to the charging time required for the sub-pixels corresponding to each scan line group to reach the target voltage; and Step S202: adjusting the duty ratio of the scan drive signal corresponding to each scan line in each scan line group in turn according to the clock signal corresponding to each scan line group.

Taking the display panel shown in FIG. 4 as an example, the display panel includes a timing control module 13 and a level shift module 14. The timing control module 13 is configured to generate a first clock signal CLK1, a second clock signal CLK2, and a frame start signal STV, and output to the level shift module 14. The level shift module 14 is configured to perform a boost operation on a received signal, and output a generated first clock signal CK and second clock signal XCK to the gate driving module 12. The gate driving module 12 includes mxn cascaded gate driving units, and each gate driving unit corresponds to a scan line. The first clock signal CK and a second clock signal CK2 have opposite phases, and are configured to act on the gate driving units corresponding to the scan lines of odd rows or even rows in turn to generate above scan drive signals (G1, G2 . . . . Gmn), thereby performing progressive scan driving on the display panel.

Figure 5:
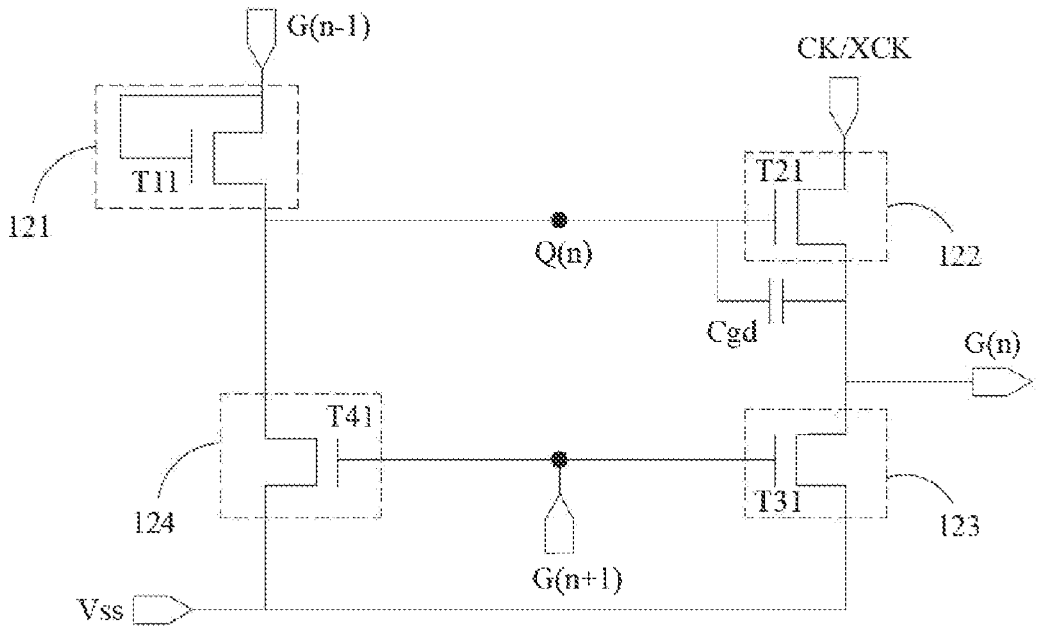
FIG. 5 is a schematic structural diagram of a gate driving unit provided by an embodiment of the present disclosure.

Referring to FIG. 5, FIG. 5 is a schematic structural diagram of a gate driving unit provided by an embodiment of the present disclosure. Taking nth stage gate driving unit as an example, it includes a pull-up control module 121, a pull-up module 122, a pull-down module 123, a pull-down maintenance module 124, and a bootstrap capacitor Cgb. The pull-up control module 121 is connected to (n−1)th stage scan drive signal G(n−1), and is connected to a first node Q(n) of a nth stage gate driving unit. The pull-up module 122 accesses the first clock signal CK or the second clock signal XCK, and is connected to the first node Q(n). The pull-up module 122 is configured to pull up the nth stage scan drive signal G(n) of the gate driving module 12 under control of potential of the first node Q(n). The pull-down module 123 is connected to a (n+1)th stage scan drive signal G(n+1) and a reference low level signal Vss, and is connected to an output end of the nth level scan drive signal G(n). The pull-down maintenance module 124 is respectively connected to an output terminal of the first node Q(n) and the output end of the nth level scan drive signal G(n), and is connected to the reference low level signal Vss. One end of the bootstrap capacitor Cgb is connected to the first node, and another end is connected to the output end of the nth stage scan drive signal G(n).

Specifically, the pull-up control module 121 includes a first thin film transistor T11. The pull-up module 122 includes a second thin film transistor T21. The pull-down module 123 includes a third thin film transistor T31. The pull-down maintenance module 124 includes a fourth thin film transistor T41.

Figure 6:
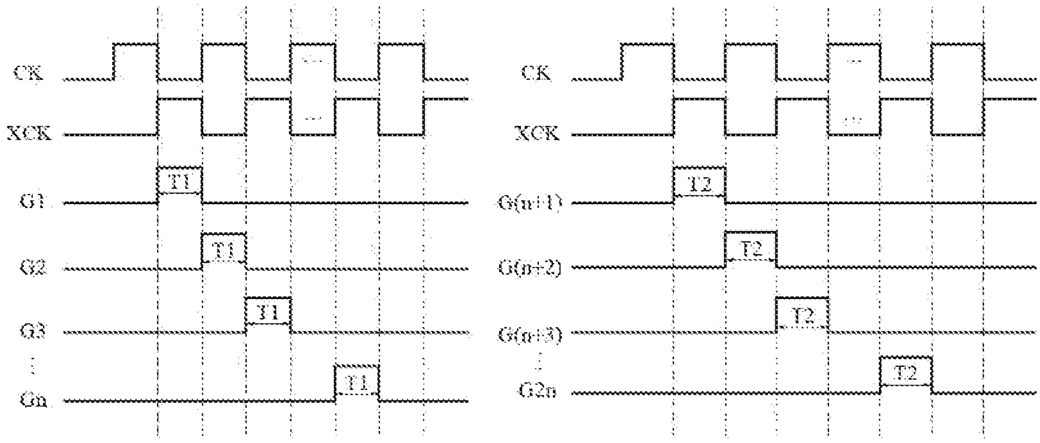
FIG. 6 is a first timing diagram of the driving method of the display panel provided by an embodiment of the present disclosure.

Further, referring to FIG. 6, FIG. 6 is a first timing diagram of the driving method of the display panel provided by the embodiments of the present disclosure. On a left is the timing diagram corresponding to the first scan line group. According to a measured charging time T1 for sub-pixels corresponding to the first scan line group to reach the target voltage, in a process of adjusting a duty ratio of the scan drive signal corresponding to the first scan line group, the first clock signal CK and the second clock signal XCK maintain a high level for both T1. The first clock signal CK and the second clock signal CK2 have opposite phases, and are configured to act on the gate driving units corresponding to the scan lines of the odd rows or the even rows in turn to generate respective scan drive signals (G1, G2 . . . . Gn) in the first scan line group. In addition, from the first scan drive signal G1 to the nth scan drive signal Gn, a time for maintaining the high level is also T1. A right side of FIG. 5 is the timing diagram corresponding to the second scan line group. According to a measured charging time T2 for sub-pixels corresponding to the second scan line group to reach the target voltage, in a process of adjusting a duty ratio of the scan drive signal corresponding to the second scan line group, a time during which the first clock signal CK and the second clock signal XCK remain the high level is adjusted to T2. The first clock signal CK and the second clock signal CK2 have opposite phases and are configured to act on the gate driving units corresponding to the scan lines of the odd rows or the even rows in turn to generate respective scan drive signals (G(n+1), G(n+2) . . . . G2*n*) in the second scan line group, and the (n+1)th scan drive signal G(n+1) to the 2nth scan drive signal G2*n* maintain the high level for a period of time T2. By analogy, until the duty ratio of the scan drive signal corresponding to the mth scan line group is adjusted, so that the scan drive signal corresponding to the mth scan line group maintains the high level for a period of time Tm. It can be seen that a high level duration of the clock signal corresponding to each scan line group is same as a high level duration of the scan drive signal corresponding to multiple rows of the sub-pixels connected to it.

Figure 7:
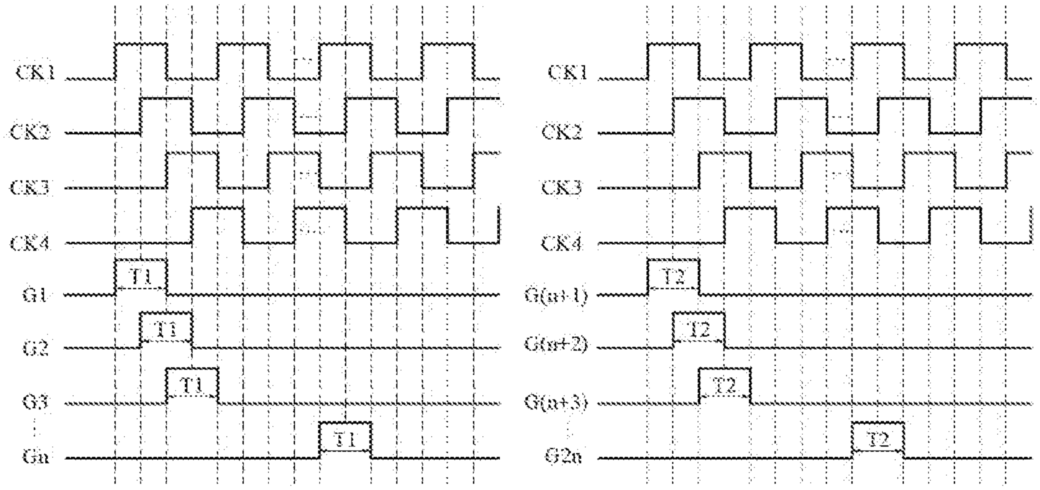
FIG. 7 is a second timing diagram of the driving method of the display panel provided by an embodiment of the present disclosure.

Of course, in some embodiments, a number of the clock signals is not limited to two in above-mentioned embodiments. Referring to FIG. 7, FIG. 7 is a second timing diagram of the driving method of the display panel provided by the embodiment of the present disclosure. In this embodiment, four clock signals are provided, which are the first clock signal CK1, the second clock signal CK2, a third clock signal CK3, and a fourth clock signal CK4. The 4 clock signals (CK1-CK4) respectively control the gate driving units of (4*b*-3), (4*b*-2), (4*b*-1), and 4*b* stages in turn to generate corresponding scan drive signals. Wherein, (1≤b≤mn/4). A left side of FIG. 6 is a timing diagram corresponding to the first scan line group. In the process of adjusting the duty ratio of the scan drive signal corresponding to the first scan line group, the first clock signal CK1 to the fourth clock signal CK4 remain the high level for a period of time T1, and a time during which the first scan drive signal G1 to the nth scan drive signal Gn maintain the high level is also T1. A right side of FIG. 6 is a timing diagram corresponding to the second scan line group. In the process of adjusting the duty ratio of the scan drive signal corresponding to the second scan line group, the first clock signal CK1 to the fourth clock signal CK4 remain the high level for a period of time T2, and a time during which the (n+1)th scan drive signal G(n+1) to the 2nth scan drive signal G2*n* remains the high level is also T2. In some other embodiments, the number of clock signals may also be 6 or 8, which can also achieve a same technical effect as a foregoing embodiment, and will not be repeated here. The number of clock signals can be limited according to actual conditions, and there is no limitation here.

Figure 8:
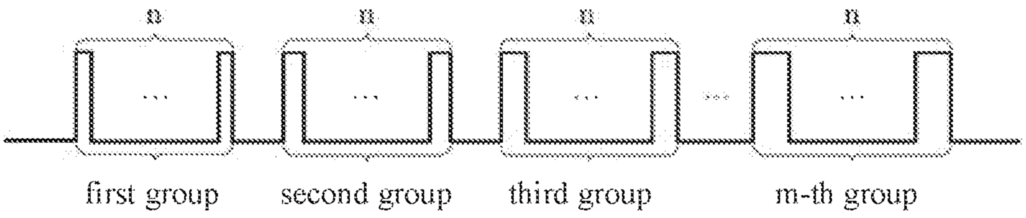
FIG. 8 is a timing diagram of a clock signal provided by an embodiment of the present disclosure.

Referring to FIG. 8, FIG. 8 is a timing diagram of a clock signal provided by an embodiment of the present disclosure. Duty ratios of clock signals corresponding to n scan lines in the first scan line group are all same. Duty ratios of clock signals corresponding to n scan lines in the second scan line group are all same. Duty ratios of clock signals corresponding to n scan lines in third scan line group are also same. By analogy, duty ratios of clock signals corresponding to n scan lines in the mth scan line group are also same, and from the first scan line group to the mth scan line group, the duty ratios of the clock signals gradually increase. It can be seen that duty ratios of clock signals corresponding to scan lines in a same scan line group are same. From the first scan line group to the last scan line group, duty ratios of the clock signals gradually increase. In this way, in each frame, from a side of the display portion 10 close to the source driving module 11 to a side far from the source driving module 11, a duty ratio of a gate drive signal corresponding to the scan line group gradually increases, and scan drive signals corresponding to the m scan line groups have m types of duty ratios that gradually increase. Therefore, a charging time of sub-pixels on the side far from the source driving module 11 is longer than a charging time of sub-pixels on the side close to the source driving module 11. Furthermore, it is ensured that each part of sub-pixels of the display panel can reach the target voltage in a same effective charging time.

It should be noted that the process of adjusting the duty ratio of the clock signal corresponding to the scan line group through a detected charging time can be completed by the timing control module 13 provided inside the display panel. Alternatively, the process of adjusting the duty ratio of the clock signal can also be done manually by an external device according to the detected charging time.

Step S30: scanning the display panel row by row according to the scan drive signal corresponding to each row of the sub-pixels.

Taking the display panel shown in FIG. 4 as an example, FIG. 4 is a schematic structural diagram of a display panel provided by an embodiment of the present disclosure. Under control of a received first clock signal CK and second clock signal XCK, the gate driving module 12 generates scan drive signals G1-Gmn), and sequentially scans and drives each scan line in each scan line group, and the source driving module 11 applies a gray-scale voltage to each column of the sub-pixels through the data line, so that the display panel presents an image.

The embodiments of the present disclosure provide a display panel, referring to FIG. 4, The display panel includes the display portion 10. The display portion 10 includes a plurality of scan lines, a plurality of data lines, and a plurality of sub-pixels (not shown in the figure). Among the plurality of sub-pixels, sub-pixels located in a same row are connected to a same scan line, and sub-pixels located in a same column are connected to a same data line. The display panel also includes:

a detection module, configured to obtain a charging time required for each row of the sub-pixels in the display panel to reach a target voltage;

a timing control module 13, configured to adjust a duty ratio of a scan drive signal corresponding to each row of the sub-pixels according to the charging time required for each row of the sub-pixels to reach the target voltage; and a gate driving module 12, configured to scan the display panel row by row according to the scan drive signal corresponding to each row of the sub-pixels.

at least two detection points are provided with the display panel, and a detection point selected from the at least two detection points is configured to detect the charging time required for a row of sub-pixels corresponding to the detection point to reach the target voltage; wherein the detection module includes:

a calculation module, configured to calculate the charging time required for each row of the sub-pixels between two adjacent detection points to reach the target voltage according to the charging time required for a row of the sub-pixels corresponding to two adjacent detection points in the at least two detection points to reach the target voltage. The detection module is connected with the at least two detection points to receive signals returned from the detection points.

In one embodiment, the display panel includes a first detection point a1 and a second detection point a2. The first detection point a1 is arranged on a side of the display portion 10 close to the source driving module 11, and is configured to detect a charging time required for a first row of sub-pixels to reach the target voltage. The second detection point a2 is arranged on a side of the display portion 10 away from the source driving module 11, and is configured to detect a charging time required for a last row of sub-pixels to reach the target voltage.

In one embodiment, referring to FIG. 2, the display panel is provided with a first detection point a1, a second detection point a2, and a third detection point a3. The third detection point a3 is arranged between the first detection point a1 and the second detection point a2. The third detection point a3 is configured to detect a charging time required for a middle row of sub-pixels located between the first row of the sub-pixels and the last row of the sub-pixels to reach a target voltage. Of course, in some embodiments, the number of detection points is not limited to two or three in the embodiments of the present disclosure, and can also be three or more. The number of detection points set on the display panel and locations of the detection points can be limited according to an actual situation, and there is no restriction here.

The display panel includes a plurality of scan line groups, and each of the scan line groups includes at least two scan lines. The detection module is further configured to obtain a charging time required for a sub-pixel corresponding to each scan line group between the two adjacent detection points to reach the target voltage by means of linear equipartition according to the charging time required for the row of the sub-pixels corresponding to two adjacent detection points of the at least two detection points to reach the target voltage and a number of the scan line groups between the two adjacent detection points. Wherein each row of the sub-pixels corresponding to each scan line in a same scan line group requires a same charging time to reach the target voltage.

The timing control module 13 includes an adjustment module, which is configured to adjust a duty ratio of a clock signal corresponding to each scan line group according to the charging time required for the sub-pixels corresponding to each scan line group to reach the target voltage. The timing control module 13 outputs an adjusted clock signal to the gate driving module 12. The gate driving module 12 can sequentially adjust the duty ratio of the scan drive signal corresponding to each scan line in each scan line group according to the clock signal corresponding to each scan line group, and output an adjusted scan drive signal to the display portion 10.

In summary, the present disclosure provides a driving method of a display panel and the display panel. The driving method of the display panel obtains a charging time required for each row of sub-pixels in the display panel to reach a target voltage. Then, according to the charging time required for each row of the sub-pixels to reach the target voltage, a duty ratio of a scan drive signal corresponding to each row of the sub-pixels is adjusted. Then, the display panel is scanned row by row according to the scan drive signal corresponding to each row of the sub-pixels. By adjusting a charging time of the sub-pixels in different positions of the display panel, the sub-pixels in each position of the display panel can reach a same target voltage, thereby improving a problem of an uneven brightness of the display panel.

In summary, although the present disclosure is disclosed as above in preferred embodiments, the above-mentioned preferred embodiments are not intended to limit the present disclosure. Those of ordinary skill in the art, without departing from the spirit and scope of the present disclosure, can make various changes and modifications. Therefore, the protection scope of the present disclosure is based on the scope defined by the claims.

What is claimed is:

1. A driving method of a display panel, the display panel comprising a plurality of sub-pixels arranged in a plurality of rows and being provided with at least two detection points, the method comprising:

detecting a first charging time required for charging ones of the sub-pixels in a first row of the plurality of rows to a target voltage and a second charging time required for charging ones of the sub-pixels in a last row of the plurality of rows to the target voltage, wherein the first row corresponds to one of the at least two detection points, and the last row corresponds to another one of the at least two detection points;

obtaining, by means of linear equipartition, a third charging time required for charging ones of the sub-pixels in each one of the plurality of rows to the target voltage based on the first charging time and the second charging time;

adjusting a duty ratio of a scan drive signal corresponding to each one of the plurality of rows by adjusting an active level duration of the scan drive signal to be equal to the third charging time required for charging the ones of the sub-pixels in each one of the plurality of rows to the target voltage, to obtain a plurality of adjusted scan drive signals with different duty ratios respectively corresponding to the plurality of rows; and scanning row by row based on the adjusted scan drive signals.

2. The driving method of the display panel of claim 1, wherein the at least two detection points comprise a first detection point and a second detection point, the first detection point is configured to detect the first charging time, and the second detection point is configured to detect the second charging time.

3. The driving method of the display panel of claim 2, wherein the at least two detection points further comprise a third detection point, and the third detection point is configured to detect a fourth charging time required for charging ones of the sub-pixels in a middle row of the plurality of rows located between the first row and the last row to the target voltage.

4. The driving method of the display panel of claim 1, wherein the display panel comprises a plurality of scan line groups, and each of the scan line groups comprises at least two scan lines;

the step of obtaining, by means of linear equipartition, the third charging time required for charging ones of the sub-pixels in each one of the plurality of rows to the target voltage based on the first charging time and the second charging time comprises:

obtaining, by means of linear equipartition, the third charging time required for charging the ones of the sub-pixels in each one of the plurality of rows corresponding to each scan line group between the first row and the last row to the target voltage based on the first charging time, the second charging time and a number of the scan line groups between the first row and the last row;

wherein ones of the sub-pixels in ones of the plurality of rows respectively corresponding to respective ones of the scan lines in a same one of the scan line groups require a same charging time to reach the target voltage.

5. The driving method of the display panel of claim 4, wherein the step of adjusting the duty ratio of the scan drive signal corresponding to each one of the plurality of rows by adjusting an active level duration of the scan drive signal to be equal to the third charging time required for charging the ones of the sub-pixels in each one of the plurality of rows to the target voltage, to obtain the adjusted scan drive signals with different duty ratios respectively corresponding to the plurality of rows comprises:

adjusting a duty ratio of a clock signal corresponding to each scan line group by adjusting an active level duration of the clock signal to be equal to the third charging time required for charging the ones of the sub-pixels in each one of the plurality of rows corresponding to each scan line group to the target voltage, to obtain an adjusted clock signal; and adjusting duty ratios of scan drive signals respectively corresponding to respective ones of the scan lines in each scan line group in turn based on the adjusted clock signal corresponding to each scan line group, to obtain the adjusted scan drive signals.

6. The driving method of the display panel of claim 5, wherein the active level duration of the clock signal corresponding to each scan line group is same as active level durations of the scan drive signals respectively corresponding to respective ones of the scan lines in the scan line group.

7. The driving method of the display panel of claim 5, wherein from a first one of the scan line groups to a last one of the scan line groups, the duty ratio of the clock signal gradually increases, and duty ratios of the clock signals respectively corresponding to respective ones of the scan lines in a same one of the scan line groups are same as each other.

8. The driving method of the display panel of claim 1, wherein the detection point is an actual detection point or a virtual detection point.

9. The driving method of the display panel of claim 4, wherein a difference in charging time between any two adjacent ones of the scan line groups is a constant value.

10. A display panel, including:

a plurality of scan lines, a plurality of data lines, and a plurality of sub-pixels arranged in an array; wherein ones of the sub-pixels in a same row are connected to a same scan line, ones of the sub-pixels in a same column are connected to a same data line, and the display panel is provided with at least two detection points; and the display panel further comprises:

a detection module, configured to:

detect a first charging time required for charging ones of the sub-pixels in a first row of the array to a target voltage and a second charging time required for charging ones of the sub-pixels in a last row of the array to the target voltage, wherein the first row corresponds to one of the at least two detection points, and the last row corresponds to another one of the at least two detection points; and obtain, by means of linear equipartition, a third charging time required for charging ones of the sub-pixels in each row of the array to the target voltage based on the first charging time and the second charging time;

a timing control module, configured to adjust a duty ratio of a scan drive signal corresponding to each row of the array by adjusting an active level duration of the scan drive signal to be equal to the third charging time required for charging the ones of the sub-pixels in each row of the array to the target voltage, to obtain a plurality of adjusted scan drive signals with different duty ratios respectively corresponding to rows of the array; and a gate driving module, configured to scan row by row based on the adjusted scan drive signals.

11. The display panel of claim 10, wherein the detection module comprises:

a calculation module, configured to calculate, by means of linear equipartition, the third charging time required for charging the ones of the sub-pixels in each row of the array to the target voltage based on the first charging time and the second charging time.

12. The display panel of claim 11, wherein the at least two detection points comprise a first detection point and a second detection point, the first detection point is configured to detect the first charging time, and the second detection point is configured to detect the second charging time.

13. The display panel of claim 12, wherein the at least two detection points further comprise a third detection point, and the third detection point is configured to detect a fourth charging time required for charging ones of the sub-pixels in a middle row of the array located between the first row and the last row to the target voltage.

14. The display panel of claim 12, wherein the display panel comprises a plurality of scan line groups, and each of the scan line groups comprises at least two scan lines, and ones of the sub-pixels in rows of the array respectively corresponding to respective ones of the scan lines in a same one of the scan line groups require a same charging time to reach the target voltage.

15. The display panel of claim 14, wherein the active level duration of a clock signal corresponding to each scan line group is same as active level durations of the scan drive signals respectively corresponding to respective ones of the scan lines in the scan line group.

16. The display panel of claim 14, wherein the calculation module is further configured to obtain, by means of linear equipartition, the third charging time required for charging the ones of the sub-pixels in each row of the array corresponding to each scan line group between the first row and the last row to the target voltage based on the first charging time, the second charging time and a number of the scan line groups between the first row and the last row.

17. The display panel of claim 16, wherein the timing control module comprises:

an adjustment module, configured to adjust a duty ratio of a clock signal corresponding to each scan line group by adjusting an active level duration of the clock signal to be equal to the third charging time required for charging the ones of the sub-pixels in each row of the array corresponding to each scan line group to the target voltage, to obtain an adjusted clock signal.

18. The display panel of claim 17, wherein from a first one of the scan line groups to a last one of the scan line groups, the duty ratio of the clock signal gradually increases, and duty ratios of the clock signals respectively corresponding to respective ones of the scan lines in a same one of the scan line groups are same as each other.

* * * * *